US007487799B2

(12) United States Patent
Wobben

(10) Patent No.: US 7,487,799 B2
(45) Date of Patent: Feb. 10, 2009

(54) FLOW CHANNEL FOR LIQUIDS

(76) Inventor: Aloys Wobben, Argestrasse 19, Aurich (DE) 26607

( * ) Notice: Subject to any disclaimer, the term of this patent is extended or adjusted under 35 U.S.C. 154(b) by 106 days.

(21) Appl. No.: 10/565,399

(22) PCT Filed: Mar. 20, 2004

(86) PCT No.: PCT/EP2004/002961

§ 371 (c)(1),
(2), (4) Date: Aug. 11, 2006

(87) PCT Pub. No.: WO2005/019658

PCT Pub. Date: Mar. 3, 2005

(65) Prior Publication Data

US 2007/0017588 A1 Jan. 25, 2007

(30) Foreign Application Priority Data

Jul. 22, 2003 (DE) ................................ 103 33 477

(51) Int. Cl.
*F16L 9/00* (2006.01)

(52) U.S. Cl. ........................... 138/37; 138/39; 138/122; 138/177; 366/336

(58) Field of Classification Search .................. 138/37, 138/39, 121, 122, 177, 178; 366/337, 336
See application file for complete search history.

(56) References Cited

U.S. PATENT DOCUMENTS 85,149 A * 12/1868 Van Anringe ................ 138/38
770,599 A * 9/1904 Monteagle ................... 138/38
862,919 A * 8/1907 Isaacs et al. .................. 138/39
1,363,416 A * 12/1920 Hooker .................. 29/890.045
2,115,769 A * 5/1938 Harris ...................... 126/91 A
2,115,796 A * 5/1938 Bradfield, Jr. ........... 24/134 KB
2,139,888 A * 12/1938 Fausek et al. ............... 138/115
3,224,814 A 12/1965 Fisher ......................... 302/64
3,273,916 A * 9/1966 Tillery ........................ 285/226
3,578,075 A * 5/1971 Winter ....................... 165/177

(Continued)

FOREIGN PATENT DOCUMENTS

AT 134543 8/1933

(Continued)

OTHER PUBLICATIONS

Bird, et al., *Transport Phenomena*, John Wiley & Sons, Wisconsin, 1960, "Velocity Distributions in Turbulent Flow," pp. 153-179.

(Continued)

*Primary Examiner*—Patrick F Brinson
(74) *Attorney, Agent, or Firm*—Seed IP Law Group PLLC

(57) ABSTRACT

The object of the present invention is to provide a flow channel for liquids or also gases, which is of such a design that the lowest possible losses occur in the flow, in particular low frictional losses. A further aim of the invention is to provide a flow channel for liquids, in which different flow regions are set. A flow channel for liquids characterized in that at least one wall defining the flow channel is of such a configuration that when a liquid flows therethrough at least one flow region is produced which has an axial and simultaneous tangential flow component.

17 Claims, 6 Drawing Sheets

U.S. PATENT DOCUMENTS

Figure 1A:
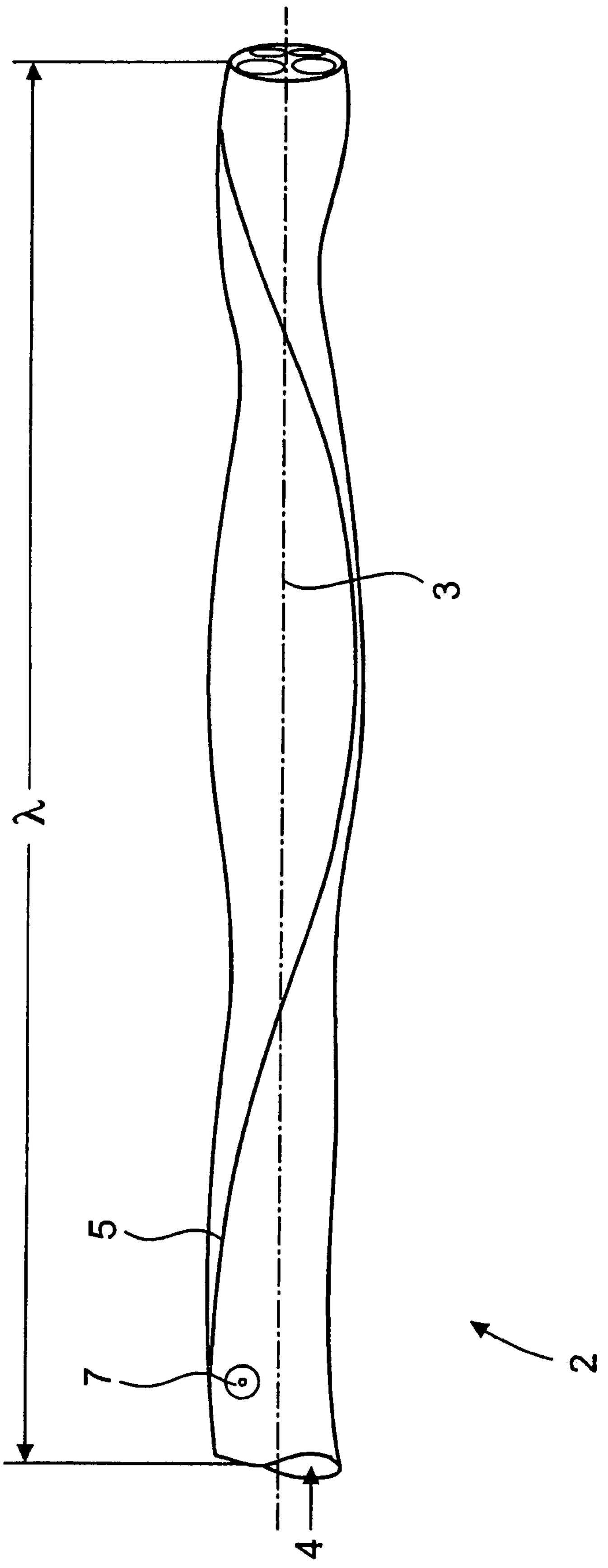

| | | | | | |
|---|---|---|---|---|---|
| 3,612,175 | A | * | 10/1971 | Ford et al. | 165/179 |
| 3,743,328 | A | * | 7/1973 | Longfellow | 285/226 |
| 3,817,319 | A | | 6/1974 | Kauder et al. | 165/1 |
| 4,843,713 | A | * | 7/1989 | Langner et al. | 29/799 |
| 4,979,296 | A | * | 12/1990 | Langner et al. | 29/890.144 |
| 5,924,456 | A | | 7/1999 | Simon | 138/122 |
| 6,997,214 | B2 | * | 2/2006 | Kuo | 138/39 |
| 7,264,394 | B1 | * | 9/2007 | Liles | 366/339 |
| 2004/0000350 | A1 | * | 1/2004 | Cymbalisty | 138/178 |
| 2004/0037986 | A1 | * | 2/2004 | Houston et al. | 428/36.9 |
| 2006/0005892 | A1 | * | 1/2006 | Kuo | 138/37 |
| 2007/0014188 | A1 | * | 1/2007 | Cymbalisty | 366/336 |

FOREIGN PATENT DOCUMENTS

| | | | |
|---|---|---|---|
| DE | 25 10 169 | | 9/1976 |
| FR | 1.002.454 | | 3/1952 |
| GB | 409528 | | 5/1934 |
| GB | 2 192 966 | A | 1/1988 |
| WO | WO 90/15256 | | 12/1990 |
| WO | WO 00/38591 | | 7/2000 |

OTHER PUBLICATIONS

Jischa, *Konvektiver Impuls-, Wärme- und Stoffaustausch*, Vieweg, Braunschweig, 1982, pp. 203-215. XP-002301995.

Spalding, et al., "Heat Exchanger Design Handbook," Hemisphere Pub. Co., Düsseldorf, 1983, pp. 2.2.2-7-2.2.2-12.

* cited by examiner

FLOW CHANNEL FOR LIQUIDS

BACKGROUND OF THE INVENTION

1. Field of the Invention

The invention concerns a flow channel for liquids.

2. Description of the Related Art

As is known liquids or also gases are passed through flow channels of the most widely varying configurations in the most widely different areas of life. The purpose in that respect is frequently to transport substances and/or energy. Examples of flow channels for liquids are pipes for example in domestic technology or process or energy technology or flow channels in fluid flow machines such as for example water turbines or sewage treatment plants. In the biological field flow channels are embodied for example in the form of veins for transporting blood.

As state of the art attention is directed at this juncture generally to the following publications: DE 198 06 513; WO 01/18406 A1; WO 00/38591 A2; U.S. Pat. Nos. 2,935,906 and 1,958,577.

A decisive characteristic parameter of flows through flow channels is the flow resistance which is governed substantially by friction and changes in direction and which is frequently expressed in the form of standardized characteristic values such as the drag resistance coefficient. Taking account of the flow resistance is of central importance in terms of designing flow channels such as pipelines and the dimensioning of pumps or other pressure-generating units.

It will be appreciated that the flow resistance and the frictional losses which occur in respect of the flow must be minimized as much as possible so that for example the amount of energy required for pumping and thus ultimately the energy consumption for an installation can be kept as low as possible. That is to be taken into consideration in the design of flow channels.

BRIEF SUMMARY OF THE INVENTION

According principles of the present invention a flow channel is provided for liquids or also gases, which is of such a design that low losses occur in the flow, in particular low frictional losses. A further aim of the invention is to provide a flow channel for liquids, in which different flow regions are set.

The invention attains that object in a flow channel of the kind set forth in this specification in that at least one wall defining the flow channel is of such a configuration that when a liquid flows therethrough at least one flow region is produced which has an axial and simultaneous tangential flow component.

Surprisingly it was found in tests that, by means of a flow channel according to the invention, on the basis of the wall configuration thereof, a flow with an axial and tangential flow component is produced at least in portion-wise manner, whereby the flow resistance is significantly reduced in comparison with conventional flow channels. That reduction in the flow resistance advantageously provides that the energy losses in the flow, the pressure losses and the resistance coefficient are reduced. Therefore a lower pump output is required to produce a given volume flow or mass flow of a liquid, than in the case of conventional flow channels. In that way for example in the case of pipelines the pump output to be applied can be markedly reduced. In the case also of fluid flow machines, hydraulic power stations or the like however the flow losses can also be reduced in accordance with the invention and thus the levels of efficiency can be increased.

Preferably a circulating spiral flow is produced in region-wise manner or completely. Experimental investigations have shown that lower flow resistances and thus flow losses occur by virtue of a wall configuration which causes a kind of circulating spiral flow through the flow channel.

In accordance with a particularly preferred embodiment it is proposed that the length of a tube portion which is completely wound once in itself (wavelength) is in a given ratio to the length of the smallest bisector of the cross-sectional area of the flow channel, which is in the range of 6 to 7, particularly preferably about 6.44. Due to the non-cylindrical configuration of the flow cross-section and twisting or winding in the axial direction, it is possible to produce an at least partially spiral-like flow with axial and tangential flow components with a low level of flow resistance in a structurally simple manner.

It has been found on the basis of tests that, with the above-specified ratio between wavelength and extent of the cross-sectional area, particularly low resistance coefficients can be achieved. An embodiment which is particularly preferred from the structural point of view and in terms of flow technology is distinguished in that the wall delimiting the flow channel is so shaped that the free flow cross-section of the flow tube is substantially oval. Such an oval configuration with at the same time twisting in itself of the flow cross-section can be particularly well implemented in a flow tube.

In a development it is proposed that the ratio of the length of the longer axis of the oval flow cross-section to the length of the shorter axis of the flow cross-section is markedly greater than 1, preferably greater than or about $\sqrt{2}$. In that way too the resistance coefficients of the flow channel can be minimized.

In a further preferred embodiment it is proposed that the flow cross-section decreases or enlarges in the flow direction. In that way, while retaining the advantages according to the invention, it is possible to increase or reduce respectively the flow conditions and in particular the flow speed.

The invention further attains its object or is further developed by a flow channel for liquids, which is so designed that within the channel when a liquid flows therethrough substantially two flow regions are produced, which do not or which scarcely interpenetrate and which are wrapped around in the nature of a double helix.

By virtue of such a configuration of the flow channel and a flow with substantially two flow regions, it is also possible to achieve low levels of flow resistance so that ultimately pump outputs are reduced and the levels of efficiency of fluid flow machines are improved. In addition different phases of a flow, for example different liquids, can be passed in partially separated relationship through a flow channel or divide into at least partially different phases even when flowing through the flow channel. Such a separation can occur for example by different constituents of a liquid with different material properties such as densities or viscosities preferably moving in given regions of the flow cross-section so that separation of a mixture into its constituent parts can occur.

A further development of the flow channel according to the invention provides that within each flow region there are produced further sub-flow regions which in turn are again intertwined with each other. In that way the flow conditions can be further improved and possibly the above-described separation effects can be enhanced.

In accordance with a further advantageous configuration it is proposed that the two core flow channels are of a substantially round configuration and form a main fluid flow and that produced in the region of the flow tube which is not occupied by the main flow cores are one or more secondary flows, wherein no or preferably only a slight fluid exchange takes place between a main flow and a secondary flow area and foreign bodies in the entire fluid flow are preferably transported in the secondary flow area. In that way also solid and liquid or different liquid phases of the flow can be formed.

BRIEF DESCRIPTION OF THE SEVERAL VIEWS OF THE DRAWING(S)

Figure 1B:
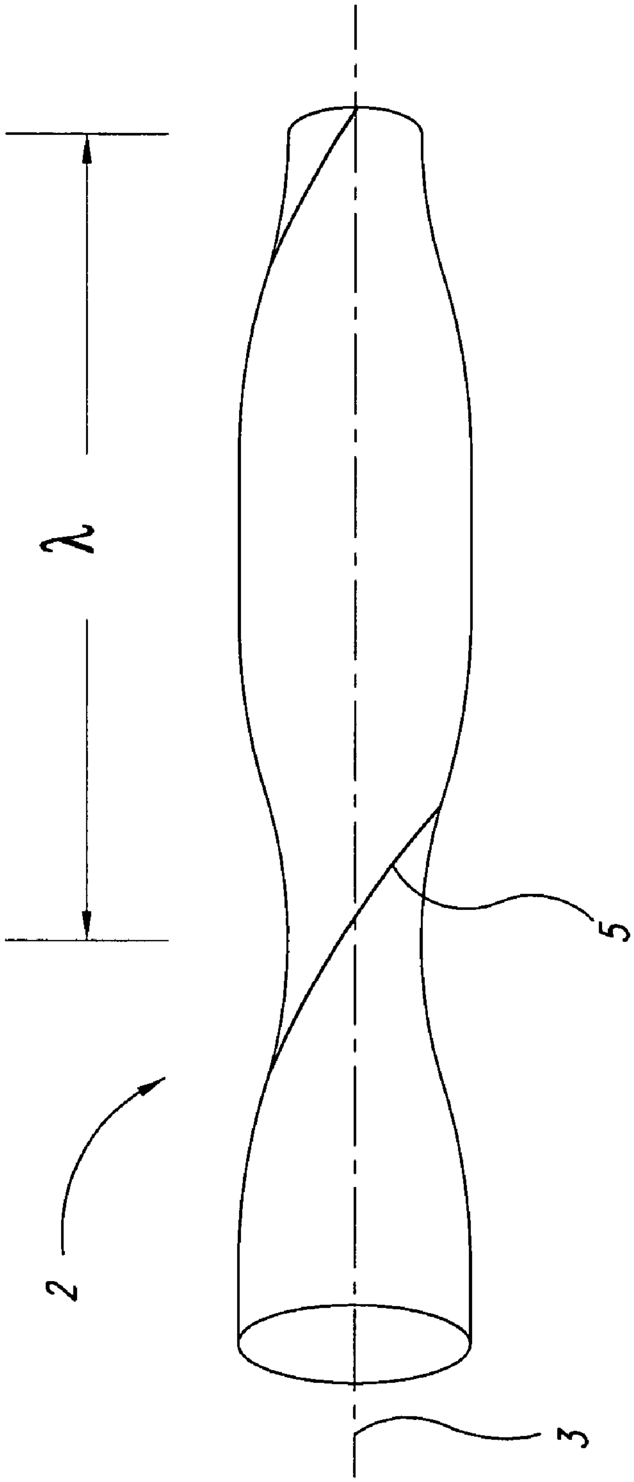

The invention is described hereinafter by means of embodiments by way of example with reference to the accompanying drawings in which:

FIG. 1A is a diagrammatic view of a flow channel provided in a flow tube, FIG. 1B is an alternate diagrammatic view showing the 360° twist.

Figure 2:
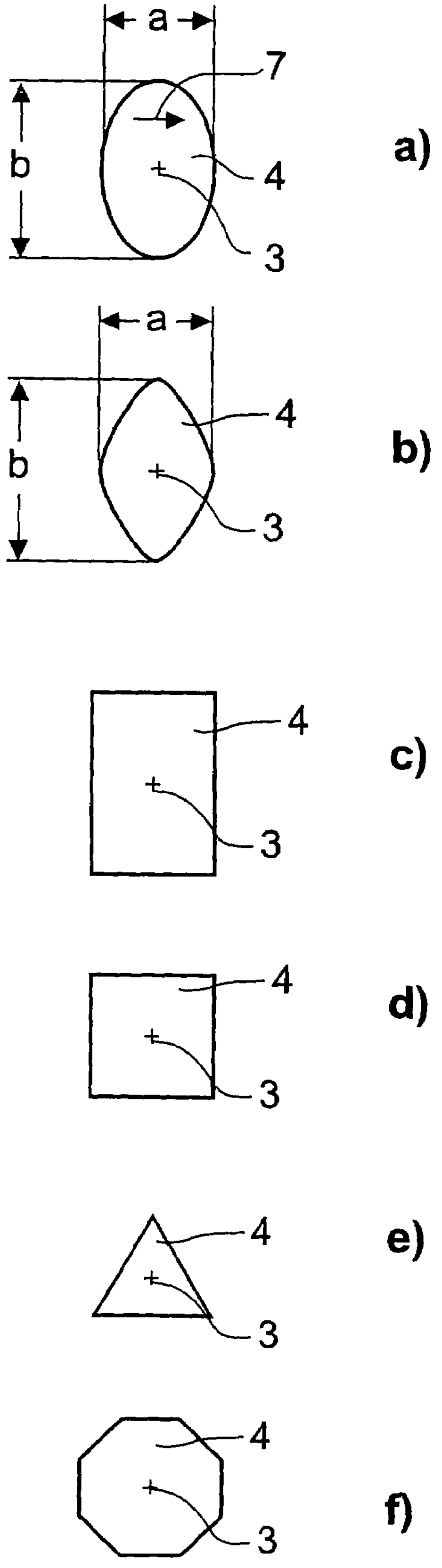
Figure 3:
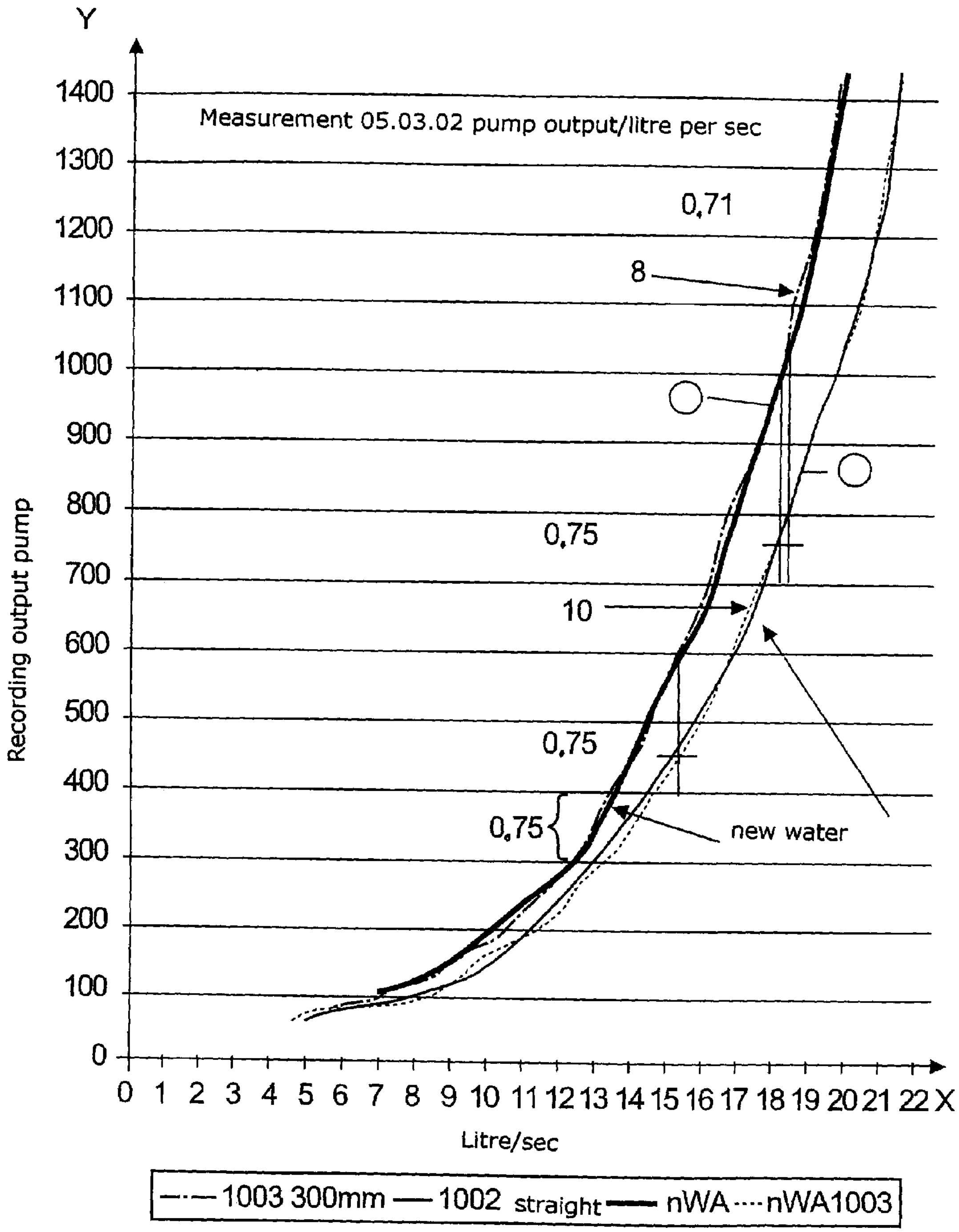
Figure 4:
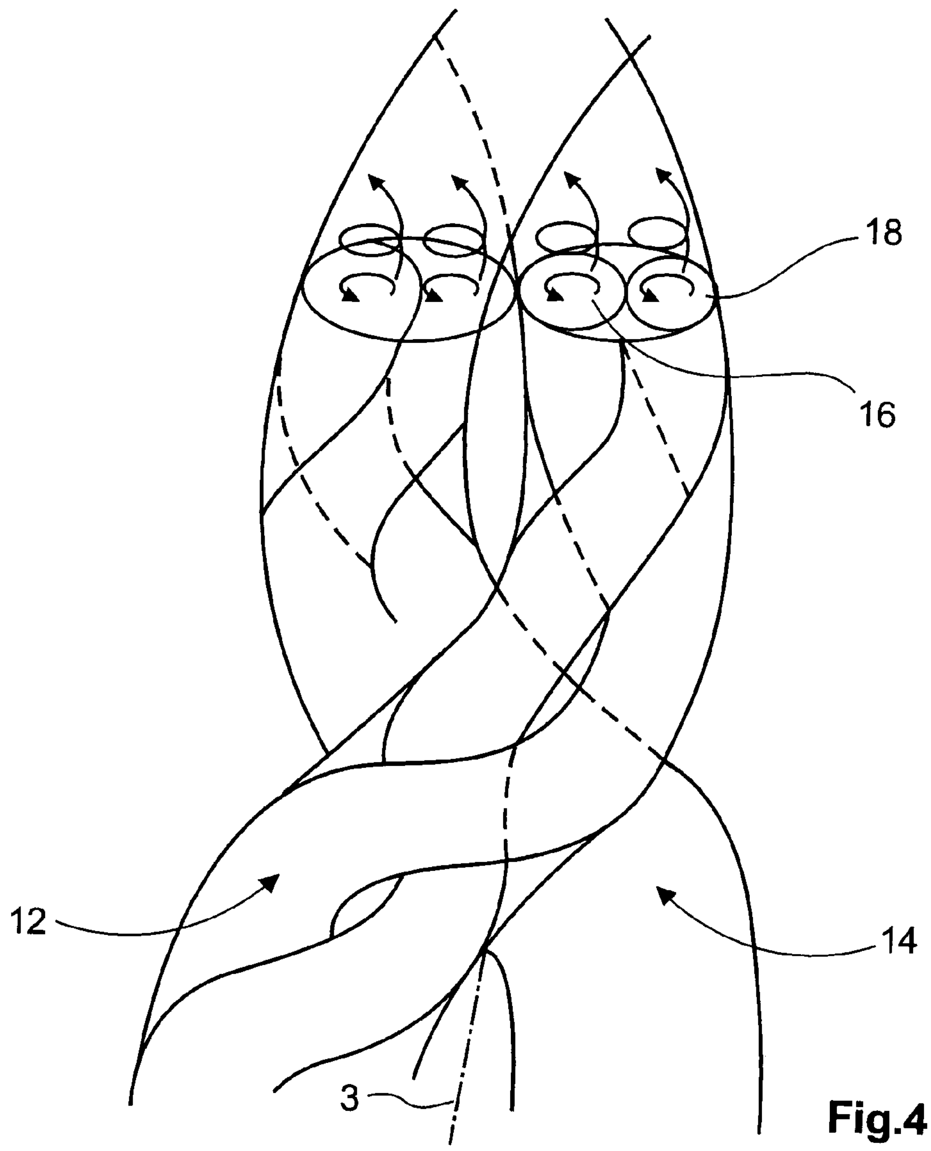
Figure 5:
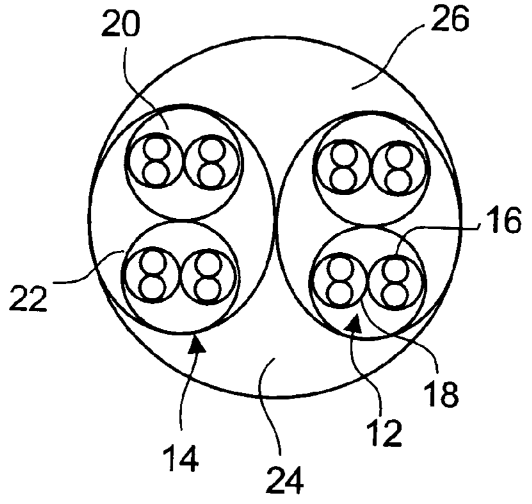
Figure 4B:
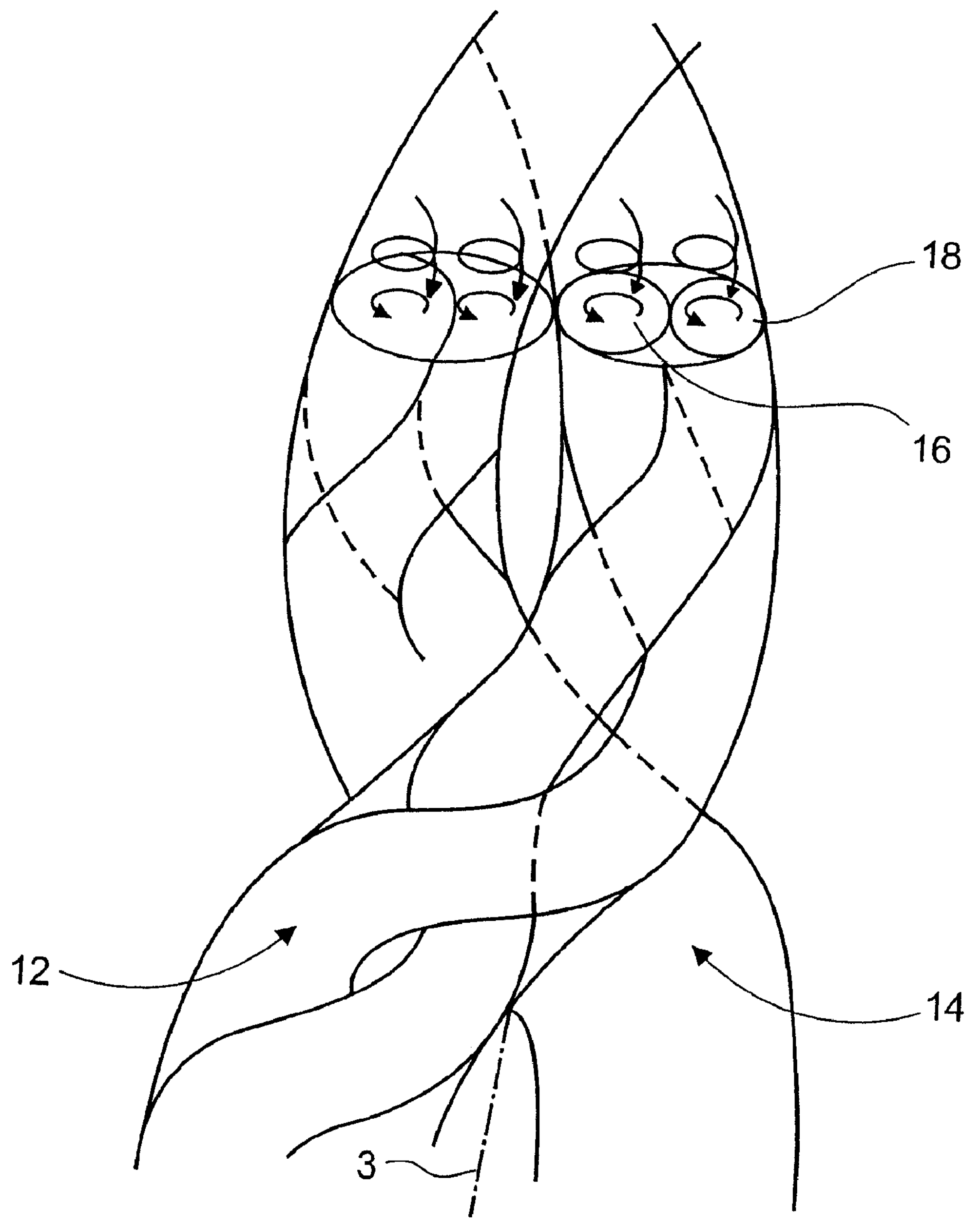

FIGS. 2*a-f* show different examples of flow channels according to the invention, FIG. 3 shows measurement results of tests with flow channels according to the invention, FIG. 4 shows a flow with different flow regions, which is diagrammatically illustrated in a flow channel according to the invention, and FIG. 5 is a diagrammatic cross-sectional view of the flow shown in FIG. 4.

DETAILED DESCRIPTION OF THE INVENTION

FIG. 1A is a side view of an embodiment of a flow tube 2 in which a flow channel 4 according to the invention is provided. Fluids, that is to say liquids or gases, can flow through the tube 2 or the flow channel 4. This can also involve multi-phase flows with different liquid components and with solid bodies such as particles or the like. In addition for example a three-phase flow with liquid, gaseous and solid components can also flow through the flow channel 4. The tube 2 can be made of plastic material or metal.

The tube 2 is preferably of such a configuration that the flow cross-section is substantially oval, as is shown in the diagrammatic views of FIG. 2*a*) and 2*b*). As FIG. 1A diagrammatically shows, the tube 2 is wound or twisted in itself in the axial direction, that is to say in the direction of the longitudinal axis 3.

In the portion of the tube 2 shown in FIG. 1A, the extent of the twist is illustrated by the line 5 which, over the illustrated length of the tube portion, performs a complete revolution through 360 degrees; that length of a single complete twist is also referred to herein as the wavelength $\lambda$.

A further view of the twists in tube 2 is shown in FIG. 1*b*, which illustrates the wavelength $\lambda$ as the tube twists 360° and continues to twist. In the side view of FIG. 1A, tube portions of greater width and smaller width are afforded by virtue of the oval cross-section (FIGS. 2*a* and 2*b*) and the twist. The lengths of the shorter and longer axes of the substantially oval flow cross-section are entered in FIGS. 2*a* and 2*b*. By means of experimental investigations it was found out that the ratio of the length of the longer axis a to the shorter axis b should preferably be greater than or equal to $\sqrt{2}$. The configuration of the wall of the tube 2 shown in FIG. 2*a* is curved somewhat less in comparison with the configuration of the walls of the embodiment shown in FIG. 2*b*.

When a liquid flows through the flow channel 4 according to the invention, a flow is produced in the flow channel 4, which not only has a flow component in the axial direction, that is to say in the direction of the axis 3, but also a flow component in a tangential direction with respect to the axis 3. That arises out of the twisted configuration of the flow channel 4 or the tube 2. That is diagrammatically illustrated in FIGS. 1 and 2*a* by arrows 7. Accordingly that produces in the flow channel 4 substantially a circulating, spiral-shaped flow through the tube 2.

The alternative flow cross-sections shown in FIGS. 2*c-f* equally result in a flow according to the invention with an axial flow component and a tangential flow component and accordingly a kind of spiral flow in the flow channel 4. FIG. 2*c* shows a rectangular flow cross-section, FIG. 2*d* shows a square flow cross-section, FIG. 2*e* shows a triangular flow cross-section and FIG. 2*f* shows an octagonal flow cross-section. A hexagonal configuration for the flow cross-section or a corresponding flow tube 2 is also possible in accordance with the invention. These embodiments by way of example are also preferably of such a configuration that the flow cross-section is twisted in itself in the axial direction (axis 3).

The ratio of the wavelength to the length of the smallest bisector of the cross-sectional area of the flow cross-section 4 is in a given ratio which is in the region of 6 to 7. Viewing FIG. 2*a* in which the smallest cross-section is denoted with a and the longest with b, the tube undergoes a 360° twist along its length within the distance of 10 times the value of a. In one embodiment, the value of $\lambda$ is between 2 and 10, and in a preferred embodiment the value of $\lambda$ is between 6 and 7, preferably about 6.5.

Results of experimental investigations with flow channels according to the invention are illustrated in FIG. 3. Measurements of the output of a pump with conventional cylindrical tubes and with oval tubes twisted in themselves in accordance with the invention were taken, using water as the liquid. In the illustration the recorded pump output is represented on the vertical Y-axis and the quantitative flow of the water through the respective tubes is shown on the horizontal X-axis. The curve 8 shows the recorded pump output for different volume flows for conventional cylindrical tubes and the curve 10 shows in comparison the pump output for different volume flows for oval tubes according to the invention. The cross-sectional areas of the cylindrical and oval tubes respectively have remained constant. It can be seen that the recorded pump output in accordance with curve 10 for tubes according to the invention, with the same volume flow, is less than in the case of conventional tubes.

FIGS. 4 and 5 show diagrammatic views of further flow channels according to the invention and flows which are produced therein in some embodiments. With a twist in respect of a flow channel in relation to the diagrammatically indicated longitudinal axis 3 of a flow channel, when a liquid flows therethrough, firstly substantially two larger flow regions 12, 14 are produced, which in the course of the flow are wrapped around in the manner of a double helix. The degree of intermingling of the regions 12, 14 is slight. Within each flow region 12, 14, sub-flow regions 16, 18 and 20, 22 respectively are formed, which in turn are again wrapped around in the manner of a double helix. Once again in those sub-flow regions 16-20, mutually twisted sub-flow regions can in turn be formed there.

As the Figures show the two main flow regions or core flow channels 12, 14 are of a substantially round cross-sectional configuration. Adjacent to the core flow channels 12, 14, secondary flows or secondary flow regions 24, 26 can be produced, in which possibly certain components, for example solid constituents, can collect. Separation of constituent parts of the liquid is possible in that way.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A flow channel for liquids wherein at least one wall defining the flow channel is of such a configuration that when a liquid flows therethrough at least one flow region is produced which has an axial and simultaneous tangential flow component, wherein the flow cross-section of the flow channel is non-cylindrical and is twisted in itself in the axial direction so that when the liquid flows therethrough a spiral-form flow is produced at least in region-wise manner, and wherein the flow channel is so designed that within the channel when a liquid flows therethrough substantially two flow regions are produced, which do not or which scarcely interpenetrate and which are wrapped around in the nature of a double helix.

2. A flow channel according to claim 1 wherein the wall is of such a configuration that a circulating spiral flow is produced in region-wise manner or completely.

3. A flow channel according to claim 1 wherein the flow cross-section of the flow channel is non-cylindrical and is twisted in itself in the axial direction so that when the liquid flows therethrough a spiral-form flow is produced at least in region-wise manner.

4. A flow channel according to claim 3 wherein the length of a tube portion which is completely wound once in itself (wavelength) is in a given ratio to the length of the smallest bisector of the cross-sectional area of the flow channel, which is in the range of 6 to 7.

5. A flow channel for liquids, in particular according to claim 1, wherein the wall delimiting the flow channel is so shaped that the free flow cross-section of the flow tube is substantially oval.

6. A flow channel according to claim 5 wherein the ratio of the length of the longer axis of the oval flow cross-section to the shorter axis of the flow cross-section is greater than 1.

7. A flow channel according to claim 1 wherein the flow cross-section decreases in the flow direction.

8. A flow channel according to claim 1 wherein the flow cross-section enlarges in the flow direction.

9. A flow channel according to claim 1 wherein the flow cross-section is quadrangular, triangular, hexagonal or octagonal.

10. A flow channel according to claim 1 wherein it is in the form of a tube.

11. A flow channel according to claim 1 wherein within each flow region there are produced further sub-flow regions which in turn are again intertwined with each other.

12. A flow channel according to claim 1 wherein the two core flow channels are of a substantially round cross-sectional configuration and form a main fluid flow and that produced in the region of the flow tube which is not occupied by the main flow cores are one or more secondary flows, wherein no or preferably only a slight fluid exchange takes place between a main flow and a secondary flow area and foreign bodies in the entire fluid flow are preferably transported in the secondary flow area.

13. A flow channel comprising:

a tube that has a non-circular cross-section, the tube having a longitudinal axis that is perpendicular to the cross-section the cross-section having a selected height and width that are different from each other, the tube undergoing a twist relative to its longitudinal axis, the twist being 360° or greater over a length of the tube that is 10 times or less than the smallest distance across the tube in the cross-sections, wherein the flow channel is so designed that within the channel when a liquid flows therethrough substantially two flow regions are produced, which do not or which scarcely interpenetrate and which are wrapped around in the nature of a double helix.

14. The tube according to claim 13 wherein the tube undergoes the 360° twist along its length over a distance of between 5 and 9 times the smallest width of its cross-section.

15. The tube according to claim 14 wherein the tube undergoes the 360° twist along its length over a distance between 6 and 7 times the smallest width of its cross-section.

16. A flow channel according to claim 5 wherein the ratio of the length of the longer axis of the oval flow cross-section to the shorter axis of the flow cross-section is greater than or equal to $\sqrt{2}$.

17. A flow channel according to claim 4 wherein the ratio is 6.44.

* * * * *